United States Patent [19]
Krasinski et al.

[11] Patent Number: 5,319,483
[45] Date of Patent: Jun. 7, 1994

[54] POLARIZATION INDEPENDENT LOW CROSS-TALK OPTICAL CIRCULATOR

[75] Inventors: Jerzy S. Krasinski; Gary W. Pearson, both of Sillwater; Phillip E. Baker, Tulsa, all of Okla.

[73] Assignees: Williams Telecommunications Group, Inc., Tulsa; Bd. of Regents, Oklahoma State University, Stillwater, both of Okla.

[21] Appl. No.: 985,288

[22] Filed: Dec. 4, 1992

[51] Int. Cl.$^5$ .................. H04B 10/24; G02B 5/30
[52] U.S. Cl. ................. 359/113; 359/143; 359/152; 359/156; 359/484; 385/11
[58] Field of Search ........... 359/113, 122, 127, 138, 359/143, 152, 156, 173, 179, 281–283, 484; 385/1, 11

[56] References Cited

U.S. PATENT DOCUMENTS

| | | | |
|---|---|---|---|
| 3,536,375 | 10/1970 | Mansell | 350/157 |
| 4,274,710 | 6/1981 | Nagao | 359/484 |
| 4,294,509 | 10/1981 | Nagao | 359/484 |
| 4,464,022 | 8/1984 | Emkey | 350/377 |
| 4,557,553 | 12/1985 | McLandrich | 350/96.15 |
| 4,609,257 | 9/1986 | Shirasaki | 350/376 |
| 4,650,289 | 3/1987 | Kuwahara | 350/375 |
| 4,671,621 | 6/1987 | Dillon, Jr. et al. | 350/403 |
| 4,685,773 | 8/1987 | Carlsen et al. | 350/401 |
| 4,753,497 | 6/1988 | Fujii et al. | 350/96.15 |
| 4,783,851 | 11/1988 | Inou et al. | 455/612 |
| 4,859,014 | 8/1989 | Schmitt et al. | 350/96.13 |
| 4,969,717 | 11/1990 | Mallinsoh | 350/335 |
| 4,973,119 | 11/1990 | Taki | 350/96.13 |
| 4,973,120 | 11/1990 | Jopson et al. | 350/96.13 |
| 4,973,124 | 11/1990 | Kaede | 350/96.15 |
| 4,974,944 | 12/1990 | Chang | 350/377 |
| 4,978,189 | 12/1990 | Blonder et al. | 350/96.12 |
| 4,987,567 | 1/1991 | Buhrer | 370/3 |
| 4,988,170 | 1/1991 | Burher | 350/377 |
| 5,031,983 | 7/1991 | Dillon, Jr. et al. | 350/96.13 |
| 5,033,830 | 7/1991 | Jameson | |
| 5,204,771 | 4/1993 | Koga | 359/484 |
| 5,212,586 | 5/1993 | Van Delden | 359/484 |

FOREIGN PATENT DOCUMENTS 0137327 10/1981 Japan ..................... 359/484

OTHER PUBLICATIONS

Fujii, Yohji, "High-Isolation Polarization-Independent Optical Circulator Coupled with Single-Mode with Single-Mode Fibers", *Journal of Lightwave Technology*, vol. 9, No. 4, Apr. 1991, pp. 456–460.

Fujii Yohji, "High-Isolation Polarization-Independent Optical Circulator", *Journal of Lightwave Technology*, vol. 9, No. 10, Oct. 1991, pp. 1238–1243.

Iwamura, Hidetoshi, et al., "Simple Polarization-Independent Optical Circulator for Optical Transmission Systems", *Electronics Letters*, Dec. 6, 1979, vol. 15, No. 25, pp. 830–831.

Mizumoto, T., et al., "Verification of Waveguide-Type Optical Circulator Operation", *Electronic Letters*, Feb. 1, 1990, vol. 26, No. 3.

(List continued on next page.)

*Primary Examiner*—Richard E. Chilcot, Jr.
*Assistant Examiner*—K. Negash

[57] ABSTRACT

There is provided an optical circulator (16) for bidirectional communication on a fiber optic communication transmission system. A reflection rhomb (17) includes a polarizing thin film (26) and an inclined, internally reflecting end surface (22). A first birefringent crystal (28) is disposed against the reflection rhomb (17). A quartz rotator (34) is disposed against the opposite side of the first birefringent crystal (28). A Faraday rotator (40) is disposed against the opposite side of the quartz rotator (34). A second birefringent crystal (46) is disposed against the opposite side of the Faraday rotator (40). The components of optical circulator (16) cooperate such that light transmitted into port 1 exits from port 2, and light transmitted into port 2 exits from port 3.

34 Claims, 2 Drawing Sheets

OTHER PUBLICATIONS

Okamura, Yasuyuki, et al., "Integrated Optical Isolator and Circulator Using Nonreciprocal Phase Shifters: A Proposal", *Applied Optics*, vol. 23, No. 11, Jun. 1, 1984, pp. 1886–1889.

Shirasaki, Masataka, et al., "A Compact Polarization-Independent Optical Circulator", *Applied Optics*, Aug. 1, 1981, vol. 20, No. 15, pp. 2683–2687.

Turner, E. H., et al., "Fiber Faraday Circulator or Isolator", *Optics Letters*, vol. 6, No. 7, Jul. 1981, pp. 322–323.

Yokohama, I., et al., "Fibre-Optic Polarizing Beam Splitter Employing Birefringent-Fibre Coupler", *Electronics Letter*, May 9, 1985, vol. 21, No. 10, pp. 415–416.

Yokohama, I., et al., "Polarization-Independent Optical Circulator Consisting of Two Fibre-Optic Polarizing Beam Splitters and Two Yig Spherical Lenses", *Electronics Letters*, Mar. 26, 1986, vol. 22, No. 7, pp. 370–372.

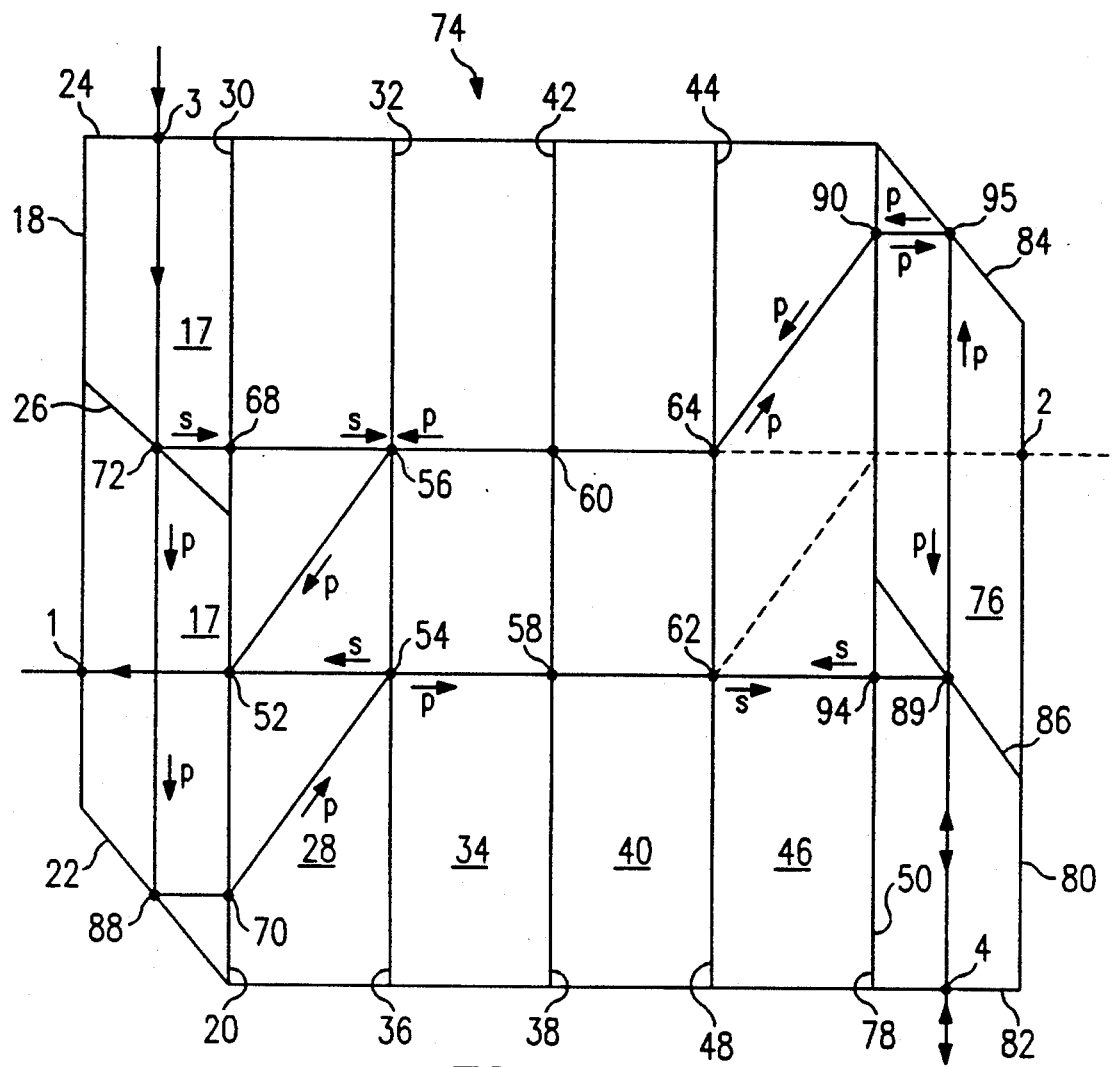
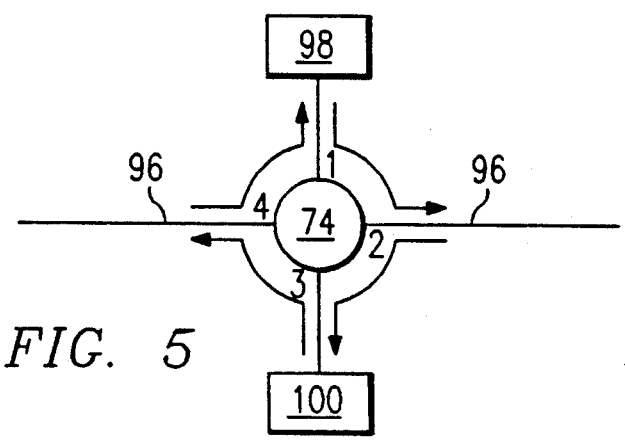
FIG. 4
FIG. 5

POLARIZATION INDEPENDENT LOW CROSS-TALK OPTICAL CIRCULATOR

TECHNICAL FIELD OF THE INVENTION

The present invention relates to optical circulators, and more particularly to a polarization independent optical circulator having low cross-talk and low insertion loss for permitting bidirectional communication on a fiber optic communication transmission system.

BACKGROUND OF THE INVENTION

A practical way to double the bit carrying capacity of an existing unidirectional fiber optic communication link is by the use of optical circulators. An optical circulator is a passive, nonreciprocal device which permits full duplex communication on a single fiber optic link. Thus, a typical fiber optic communication link operating on two fibers can be quickly and economically converted to a bidirectional, single fiber communication link by installing an optical circulator at each end of the link.

FIG. 1 illustrates in block diagram form the operation of an optical circulator. From a block diagram point of view, the optical circulator can be viewed as a three-port device, having ports 1, 2, and 3. Light that enters port 1 exits the optical circulator at port 2. However, light that enters the optical circulator at port 2 exits at port 3. The fact that an optical circulator treats light moving in different directions differently makes it a non-reciprocal device. Though various designs are possible, the most commonly used component which gives a bulk optics circulator its non-reciprocity is a Faraday rotator.

FIG. 2 illustrates, in block diagram form, how a pair of optical circulators can be used to provide simultaneous, bidirectional communication on a single fiber optic link. Optical circulators 10 and 12, each having ports 1, 2, and 3, are installed at opposite ends of fiber optic link 14. For each optical circulator 10 and 12, a communication transmitter is located at port 1, the fiber is connected to port 2, and a communication receiver is located at port 3. In this manner, light emitted from each transmitter is launched onto fiber link 14 from opposite ends in opposite directions. At the end of each respective path, optical circulators 10 and 12 separate incoming signals from outgoing signals, so that the transmitters and receivers do not interfere with each other.

One of the major advantages of optical circulators over more traditional 3 dB couplers is that the loss penalty is much lower. Using a 3 Db coupler at each end of a fiber link, there is a guaranteed insertion loss of at least 6 dB. For connections which operate near their detection limits, this additional 6 dB loss could make bidirectional communication unworkable.

In a real optical circulator, two important considerations are insertion loss and cross-talk. Insertion loss is the difference in power between light launched into the optical circulator and the power that exits the device. Insertion loss is primarily due to absorption of light and to imperfect polarization separation.

Cross-talk in an optical circulator refers to the amount of power emitted at port 3 (to the receiver) from light entering at port 1 (from the transmitter). Cross-talk is represented in FIG. 1 by the dashed line from port 1 to port 3. Due to fiber losses, the near end transmitter of a fiber optic communication system is generating much higher power levels than the near end receiver would normally see from the far end transmitter. If cross-talk is too high, the coupling of power from transmitter 1 into receiver 1 in FIG. 2 will overpower the signal from distant transmitter 2 and make the optical circulator useless for telecommunications purposes.

The primary cause of cross-talk in optical circulators is back-reflection from the various optical elements in the device. Since the optical circulator 'steers' the light rays depending on the direction of the rays, light originally from the near end transmitter but back-reflected from certain surfaces in the device and fiber are treated exactly as if these rays originally came from the far end transmitter.

Prior art optical circulators are described in U.S. Pat. No. 4,650,289, issued to Kuwahara; U.S. Pat. No. 4,464,022, issued to Emkey; and in U.S. Pat. No. 4,859,014, issued to Schmitt etal. However, insertion loss and/or cross-talk in optical circulators made as described in these references are unacceptably high for many communications applications. Therefore, a need exists for an optical circulator having lower insertion loss and cross-talk than that found in present optical circulators.

SUMMARY OF THE INVENTION

The optical circulator of the present invention comprises a reciprocal polarization element, a non-reciprocal polarization element, first and second birefringent crystals, and a reflecting means.

The reciprocal polarization element has first and second side surfaces. The first side of the non-reciprocal polarization element is disposed against the second side surface of the reciprocal polarization element. The first birefringent crystal has first and second side surfaces, the second side surface being disposed against the first side surface of the reciprocal polarization element. The second birefringent crystal has first and second side surfaces, the first side surface being disposed against the second side surface of the non-reciprocal polarization element. The reflecting means is disposed adjacent to one of the first and second birefringent crystals.

Light incident upon a first point on the reflecting means is transmitted to a point on the birefringent crystal not adjacent to the reflecting means, whereby light incident upon the point on the birefringent crystal not adjacent the reflecting means is transmitted to a second point on the reflecting means.

Two factors contribute to lower insertion loss and cross-talk in the optical circulator of the present invention than in prior optical circulators. First, the use of birefringent crystals instead of traditional polarization spitting cubes results in much more complete polarization of incident, randomly polarized light. Second, the components of the optical circulator of the present invention are in optical contact with one another, thereby reducing back reflections.

BRIEF DESCRIPTION OF THE DRAWINGS

For a more complete understanding of the present invention and the advantages thereof, reference is now made to the following detailed description taken in conjunction with the accompanying drawings, in which:

FIG. 4 is a cross-sectional view of an optical circulator according to an alternative embodiment of the present invention, showing the paths of light rays from port 3 to port 4, and from port 4 to port 1.

FIG. 5 is a block diagram representation of a bidirectional communication system utilizing an optical circulator of the present invention to provide amplification.

DETAILED DESCRIPTION OF THE INVENTION

Figure 1:
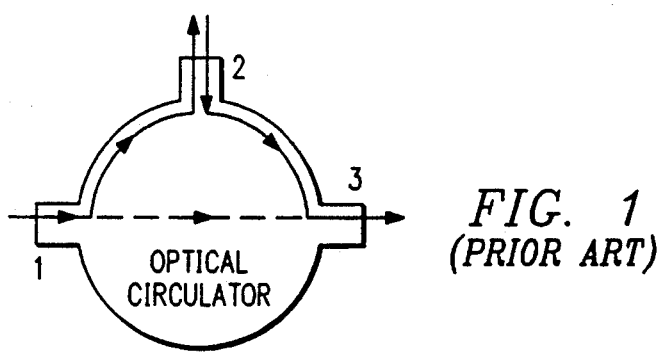
FIG. 1 is a simplified illustration of the operation of an optical circulator.
Figure 2:
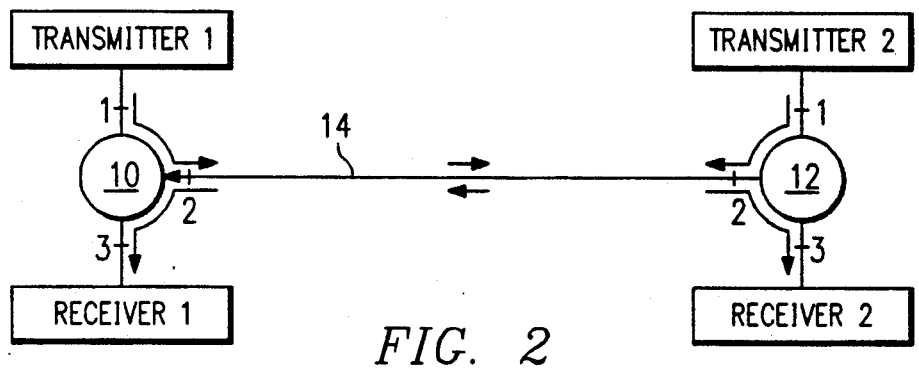
FIG. 2 is a block diagram representation of a bidirectional communication system utilizing an optical circulator at each end of a single fiber optic link.

The preferred embodiment of the present invention and its advantages are best understood by referring to the drawings, like numerals being used for like and corresponding parts of the various drawings.

Figure 3:
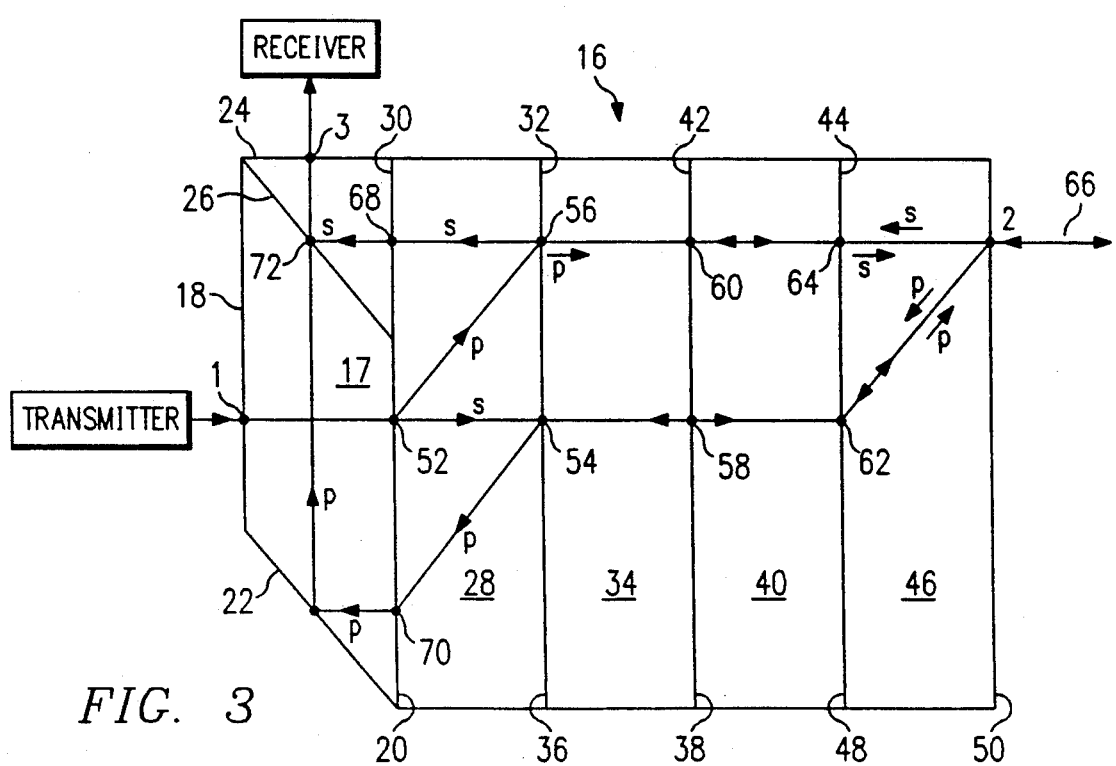
FIG. 3 is a cross-sectional view of the optical circulator of the present invention, showing the paths of light rays from a transmitter to the fiber, and from the fiber to a receiver.

Referring to FIG. 3, there is shown a cross-sectional view of an optical circulator, generally designated 16, of the present invention. As seen, optical circulator 16 comprises several layers of components in optical contact. The leftmost component, as seen in FIG. 3, is reflection rhomb 17. Reflection rhomb 17 is a light transmitting member having first side surface 18 and second side surface 20. Side surfaces 18 and 20 are connected by first end surface 22 and second end surface 24. First end surface 22 is inclined with respect to side surfaces 18 and 20. A flat, polarizing thin film 26 is embedded within reflection rhomb 17 near end surface 24, and is inclined with respect to end surface 24. Reflection rhomb 17 preferably comprises quartz or glass. Polarizing thin film 26 preferably comprises layers of dielectric material.

Immediately adjacent to side surface 20 of reflection rhomb 17 is first birefringent crystal 28. Birefringent crystal 28 has first side surface 30 in optical contact with surface 20 of reflection rhomb 17, and second side surface 32 opposite thereto. Birefringent crystal 28 preferably comprises futile or calcite.

Immediately adjacent to side surface 32 of birefringent crystal 28 is quartz rotator or lambda half plate 34, which serves as a reciprocal polarization element in optical circulator 16. Although described with reference to a quartz rotator, it is to be understood that the optical circulator of the present invention will work equally well with other reciprocal polarization elements substituted therefor. Quartz rotator 34 has first side surface 36 in optical contact with side surface 32 of birefringent crystal 28, and second side surface 38 opposite thereto. Quartz rotator 34 preferably comprises quartz.

Immediately adjacent to side surface 38 of quartz rotator 34 is Faraday rotator 40, which serves as a non-reciprocal polarization element in optical circulator 16. Although described with reference to a Faraday rotator, it is to be understood that the optical circulator of the present invention will work equally well with other non-reciprocal polarization elements substituted therefor. Faraday rotator 40 has first side surface 42 in optical contact with side surface 38 of quartz rotator 34, and second side surface 44 opposite thereto. Faraday rotator 40 preferably comprises yttrium-iron garnet crystal (YIG).

Immediately adjacent to side surface 44 of Faraday rotator 40 is second birefringent crystal 46, the final component of optical circulator 16. Birefringent crystal 46 has first side surface 48 in optical contact with side surface 44 of Faraday rotator 40, and second side surface 50 opposite thereto. Birefringent crystal 46 preferably comprises futile or calcite.

Optical circulator 16 operates in the following manner when used in a bidirectional fiber optic communication system: A fiber optic communication transmitter emits a beam of randomly polarized light into reflection rhomb 17 at port 1, as indicated in FIG. 3. The emitted light beam passes unaffected through reflection rhomb 17 to point 52, where it enters birefringent crystal 28. Birefringent crystal 28 divides the randomly polarized beam into two diverging beams, one for each of two orthogonal, linearly polarized states of light. For purposes of this description, the first linearly polarized state, denoted p-polarized light, is assumed to be polarized in the plane of FIG. 3. The second, orthogonal linearly polarized state, denoted s-polarized light, is assumed to be polarized perpendicular to the plane of FIG. 3. Assume further that birefringent crystal 28 is oriented such that the path of s-polarized light is unaffected by birefringent crystal 28. The s-polarized light thus continues in a straight line through birefringent crystal 28 to point 54. The p-polarized light, on the other hand, is deflected by birefringent crystal 28, and proceeds to point 56 on surface 32 of birefringent crystal 28. The p-polarized light exits birefringent crystal 28 traveling in a path parallel to, but displaced laterally from, the path of the s-polarized light.

As the s- and p-polarized light beams pass through quartz rotator 34 to points 58 and 60, respectively, their polarization states are rotated by 45 degrees. For purposes of this description, it is assumed that the polarization rotation imparted to the s-polarized beam and to the p-polarized beam is in a clockwise direction. For purposes of this description, the direction of polarization rotation is measured with respect to the direction of propagation of the light. As the partially rotated light beams pass through Faraday rotator 40 to points 62 and 64, respectively, their polarization states are rotated an additional 45 degrees clockwise. Thus, when the previously s-polarized light exits Faraday rotator 40 at point 62, its polarization has been rotated a full 90 degrees clockwise, converting it to p-polarized light. Similarly, when the previously p-polarized light exits Faraday rotator 40 at point 64, its polarization has also been rotated 90 degrees clockwise, converting it to s-polarized light. The divided light bee thus enter birefringent crystal 46 with their polarizations reversed.

Birefringent crystal 46 is oriented like birefringent crystal 28, so that the now s-polarized light beam continues in a straight line from point 64 to port 2 of optical circulator 16. The now p-polarized light beam, on the other hand, is deflected as it passes through birefringent crystal 46. At port 2, the two divided beams are recombined. The recombined beams exit optical circulator 16 and enter fiber optic link 66 as a single beam of randomly polarized light.

FIG. 3 also illustrates the path of a beam of randomly polarized light entering port 2 of optical circulator 16 from fiber optic link 66. Birefringent crystal 46 divides the beam into separate beanie of s-polarized and p-polarized light. The path of the s-polarized light beam is unaffected by birefringent crystal 46. The s-polarized light thus continues in a straight line through birefringent crystal 46 to point 64. The p-polarized light beam, on the other hand, is deflected by birefringent crystal 46, and proceeds to point 62. The p-polarized beam exits birefringent crystal 46 at point 62 traveling in a path parallel to, but displaced laterally from, the path of the s-polarized beam.

Being a non-reciprocal polarization element, Faraday rotator 40 rotates the polarization of light passing through it from right to left in the opposite direction from that of light passing from left to right. Thus, the p-polarized and s-polarized beams have their polarizations rotated 45 degrees counter-clockwise as they pass through Faraday rotator 40 from point 62 to point 58, and from point 64 to point 60, respectively. Being a reciprocal polarization element, quartz rotator 34 rotates the polarization of the light passing from right to left in the same direction as it rotates the polarization of light passing from left to right. Thus, the polarization states of the p-polarized and s-polarized beams are both rotated 45 degrees clockwise as they pass through the quartz rotator from point 58 to point 54, and from point 60 to point 56, respectively. The 45 degree clockwise polarization rotation in the quartz rotator cancels the 45 degree counter-clockwise rotation in the Faraday rotator, and the net result is zero polarization rotation for both beams. Hence, the p-polarized beam remains p-polarized as it exits quartz rotator 34 at point 54, and the s-polarized beam remains s-polarized as it exits at point 56.

The s-polarized beam continues undeflected through birefringent crystal 28 to point 68 on surface 30. The p-polarized beam, on the other hand, is deflected as it passes through birefringent crystal 28, and proceeds to point 70 on surface 30. The p-polarized beam exits birefringent crystal 28 traveling in a path parallel to that of the s-polarized beam.

Due to total internal reflection, the inclined end surface 22 of reflection rhomb 17 reflects the p-polarized beam to point 72 on polarizing thin film 26. Polarizing thin film 26 recombines the s-polarized and p-polarized beams into a single beam of randomly polarized light. The recombined beam exits optical circulator 16 at port 3 where it enters a fiber optic communication receiver.

As described above, the divided light bee passing through optical circulator 16 from the transmitter to fiber optic length 66 undergo a net 90° polarization rotation. Similarly, the divided light bee passing through optical circulator 16 from fiber optic length 66 to the receiver undergo a net 0° polarization rotation. It is to be observed, however, that optical circulator 16 will function as described above so long as the net polarization rotation imparted to the divided light beams passing through optical circulator 16 from left to right is 90° plus any positive or negative multiple of 180°, or 90°±n180°, where n≧0. Further, the net polarization rotation imparted to the divided beams passing through optical circulator 16 from right to left can be 0° plus any positive or negative multiple of 180°, or 0°±n180°. The all-fiber optical circulator of the present invention is therefore not limited to the specific embodiment described above.

It should be observed that optical circulator 16 can alternatively be used as an optical isolator. An optical isolator can be viewed as a 2-port device. Light which enters port 1 of the optical isolator exits at port 2, as in an optical circulator. However, light which enters port 2 is absorbed by a light absorbing material, and goes nowhere. Simply replacing the communication receiver at port 3 with a light absorbing material will convert optical circulator 16 into an optical isolator.

Two factors contribute to lower insertion loss and lower cross-talk in optical circulator 16 of the present invention than in prior optical circulators. First, the use of birefringent crystals instead of traditional polarization splitting cubes results in much more nearly complete polarization of incident light. More nearly complete polarization reduces cross-talk because back-reflection from the transmitter will occur at fewer component surfaces when complete polarization separation is achieved. This can be seen from the path of the p-polarized light beam from the transmitter to fiber optic link 66 in FIG. 3. Assuming complete separation of p-polarized from s-polarized light in birefringent crystal 28, back-reflection cannot occur until the p-polarized beam reaches point 64, at which point it is converted to s-polarized light. The now s-polarized light that is back-reflected from surfaces 44, 48 and 50 will be indistinguishable from the s-polarized light from fiber 66, and will follow its path to the receiver. Thus only three surfaces, 44, 48 and 50 can produce harmful back-reflection if complete polarization separation is achieved.

However, if incomplete separation of p-polarized from s-polarized light occurs, then some s-polarized light will follow the path of p-polarized light from point 52 to point 64. In that case, back-reflection of s-polarized light will occur not only at surfaces 44, 48 and 50, but also at surfaces 32, 36, 38 and 42. Therefore it is essential that the polarization of light in an optical circulator be as complete as possible if cross-talk is to be minimized. Because the birefringent crystals of the present invention separate polarizations nearly completely, back-reflection from surfaces 32, 36, 38 and 42 is negligible. The more complete polarization separation achieved by the use of birefringent crystals also reduces insertion loss in the optical circulator of the present invention.

It should be noted that back-reflection from the above-mentioned surfaces to the receiver can be reduced or eliminated by transmitting the incoming light beam at an angle offset slightly from perpendicular to the back-reflecting surfaces. In this manner, back reflections would not be coupled directly back to the receiver, but would exit the optical circulator at a point away from the receiver. A 2 to 3 degree offset of the emitted beam from perpendicular to surfaces 44, 48 and 50 would be sufficient to avoid most back-reflections to the receiver. This offset can be achieved by inclining the back-reflecting surfaces 2 to 3 degrees with respect to surface 18 of reflection rhomb 17.

The second factor which reduces cross-talk in the optical circulator of the present invention is the fact that the components are in optical contact with one another. Back reflection is higher in optical circulators having discrete, physically separated optical components.

Referring now to FIG. 40 there is shown an optical circulator 74 according to an alternative embodiment of the present invention. Optical circulator 74, like optical circulator 16, comprises reflection rhomb 17, first birefringement crystal 28, quartz rotator 34, Faraday rotator 40, and second birefringement crystal 46. However, unlike optical circulator 16, optical circulator 74 includes second reflection rhomb 76 immediately adjacent to side surface 50 of second birefringement crystal 46. Reflection rhomb 76 is a light transmitting member having first side surface 78 and second side surface 80. Side surfaces 78 and 80 are connected by first end surface 82 and second end surface 84. Second end surface 84 is inclined with respect to side surfaces 78 and 80. A flat, polarizing thin film 86 is embedded within reflection rhomb 76, and is inclined with respect to end surface 82. Reflection rhomb 76, like reflection rhomb 17, preferably comprises quartz or glass. Polarizing thin film 86 preferably comprises layers of dielectric material.

Unlike optical circulator 16, optical circulator 74 is a four-port device. As with optical circulator 16, ports 1 and 3 are located on side surface 18 and end surface 24 of reflection rhomb 17, respectively. Port 2 is located on side surface 80 of reflections rhomb 76, and port 4 is located on end surface 82 of reflection rhomb 76. As described above with respect to optical circulator 16, light that enters port 1 exits optical circulator 74 at port 2, and light that enters port 2 exits at port 3. As will be shown below, light that enters port 3 of optical circulator 74 will exit at port 4, and light that enters port 4 will exit at port 1.

Assume that a beam of randomly polarized light is emitted into reflection rhomb 17 of optical circulator 74 at port 3, as indicated in FIG. 4. The emitted beam passes unaffected through reflection rhomb 17 to point 72 on polarizing thin film 26. Polarizing thin film 26 reflects s-polarized light, but transmits p-polarized light. The s-polarized beam is thus reflected to point 68, where it enters birefringement crystal 28. As explained above with reference to optical circulator the s-polarized beam continues in a straight path through birefringement crystal 28 to point 56. The p-polarized beam, which is transmitted by polarizing thin film 26, continues in a straight path to point 88 on end surface 22 of reflection rhomb 17. Due to total internal reflection, inclined end surface 22 reflects the p-polarized beam to point 70, where it enters birefringement crystal 28. As explained above with reference to optical circulator 16, the p-polarized beam is deflected by birefringement crystal 28, and proceeds to point 54 on surface 32 of birefringement crystal 28. The p-polarized light beam thus exits birefringent crystal 28 traveling in a path parallel to, but displaced laterally from, the path of the s-polarized beam.

As described above with reference to optical circulator 16, the divided light beams passing through quartz rotator 34 and Faraday rotator 40 from left to right undergo a net 90° polarization rotation. The s-polarized light beam is thus converted to a p-polarized beam exiting Faraday rotator 40 at point 64, and the p-polarized light beam is converted to an s-polarized beam exiting Faraday rotator 40 at point 62.

The now s-polarized beam continues undeflected through birefringent crystal 46 and reflection rhomb 76 to point 89 on polarizing thin film 86. The now p-polarized beam, on the other hand, is deflected as it passes through birefringent crystal 46, and proceeds to point 90 on surface 50. The p-polarized beam is again deflected as it exits birefringent crystal 46 and enters reflection rhomb 76 at point 90. Due to total internal reflection, inclined end surface 84 of reflection rhomb 76 reflects the p-polarized beam to point 89 on polarizing thin film 86. The s- and p-polarized beams recombine at polarizing thin film 86 into a single beam of randomly polarized light. The recombined beam exits optical circulator 74 at port 4.

FIG. 4 also illustrates the path of a beam of randomly polarized light entering port 4 of optical circulator 74. The emitted beam passes through reflection rhomb 76 to point 89 on polarizing thin film 86. Like polarizing thin film 26, polarizing thin film 86 reflects s-polarized light but transmits p-polarized light. The s-polarized beam is thus reflected to point 94, where it enters birefringent crystal 46. The s-polarized beam continues in a straight path through birefringent crystal 46 to point 62. The p-polarized beam, which is transmitted by reflection rhomb 76, continues in a straight path to point 95 on end surface 84 of reflection rhomb 76. Due to total internal reflection, inclined end surface 84 reflects the p-polarized beam to point 90, where it enters birefringent crystal 46. The p-polarized beam is deflected by birefringent crystal 46, and proceeds to point 64 on surface 48 of birefringent crystal 46.

As described above with reference to optical circulator 16, the divided light beams passing through Faraday rotator 40 and quartz rotator 34 from right to left undergo a net 0° polarization rotation. Hence, the p-polarized beam remains p-polarized as it exits quartz rotator 34 at point 56, and the s-polarized beam remains s-polarized as it exits at point 54.

The s-polarized beam continues in a straight path through birefringent crystal 28 to point 52. The p-polarized beam, on the other hand, is deflected by birefringent crystal 28 to point 52. The s- and p-polarized beams recombine at point 52 into a single beam of randomly polarized light. The recombined beam proceeds through reflection rhomb 17 and exits optical circulator 74 at port 1.

Shown in dashed lines on FIG. 4 are the paths of light beams to and from port 2 of optical circulator 74, which paths were discussed above with reference to optical circulator 16 and FIG. 3.

FIG. 5 illustrates an alternative application in which all four ports of optical circulator 74 are used to provide amplification in a bidirectional fiber optic communication link. Adjacent ends of fiber optic link 96 are fusion spliced to ports 2 and 4 of optical circulator 74. Optical amplifiers 98 and 100 are located at ports 1 and 3, respectively. Light passing from left to right along fiber optic link 96 enters port 4 of optical circulator 74, and exits at port 1, where it enters optical amplifier 98. The amplified light reenters optical circulator 74 at port 1, and exits at port 2, where it again proceeds along fiber optic link 96 from left to right. Light passing from right to left along fiber optic link 96 enters port 2 of optical circulator 74, and exits at port 3, where it enters optical amplifier 100. The amplified light reenters optical circulator 74 at port 3, and exits at port 4, where it again proceeds along fiber optic link 96 from right to left.

The present invention, and many of its intended advantages, will be understood from the foregoing description and it will be apparent that, although the invention and its advantages have been described in detail, various changes, substitutions and alterations may be made in the manner, procedure, and details thereof without departing from the spirit and scope of the invention, as defined by the appended claims, or sacrificing all of its material advantages, the forth hereinbefore described being merely a preferred or exemplary embodiment thereof.

What is claimed is:

1. An optical circulator, comprising:
 a reciprocal polarization element having first and second side surfaces;
 a non-reciprocal polarization element having first and second side surfaces, the first side surface being disposed against the second side surface of the reciprocal polarization element;

a first birefringent crystal having first and second side surfaces, the second side surface being disposed against the first side surface of the reciprocal polarization element;

a second birefringent crystal having first and second side surfaces, the first side surface being disposed against the second side surface of the non-reciprocal polarization element; and reflecting means disposed adjacent to one of the first and second birefringent crystals, whereby light incident upon a first point on the reflecting means is transmitted to a point on the birefringent crystal not adjacent to the reflecting means, and whereby light incident upon the point on the birefringent crystal not adjacent to the reflecting means is transmitted to a second point on the reflecting means.

2. The optical circulator of claim 1, wherein the reflecting means is a light transmitting member having first and second side surfaces and an end surface inclined with respect to the first and second side surfaces.

3. The optical circulator of claim 2, wherein the inclined end surface of the member reflects light transmitted through the member.

4. The optical circulator of claim 2, further including a polarizing thin film associated with the reflecting means for combining light rays incident thereon from opposite sides thereof 5. The optical circulator of claim 1, wherein the non-reciprocal polarization element comprises yttrium-iron garnet crystal (YIG).

6. The optical circulator of claim 1, wherein the reciprocal polarization element comprises quartz.

7. An optical circulator, comprising:

a reflection rhomb having first and second light transmissive side surfaces, having an inclined first end surface connecting the first and second side surfaces, having a second end surface opposite the first end surface, and having a polarizing thin film located between the first and second end surfaces;

a first birefringent crystal having first and second side surfaces, the first side surface being disposed against the second side surface of the reflection rhomb;

a reciprocal polarization element having first and second side surfaces, the first side surface being disposed against the second side surface of the first birefringent crystal;

a non-reciprocal polarization element having first and second side surfaces, the first side surface being disposed against the second side surface of the reciprocal polarization element; and a second birefringent crystal having first and second side surfaces, the first side surface being disposed against the second side surface of the non-reciprocal polarization element.

8. The optical circulator of claim 7, wherein the polarizing thin film of the reflection rhomb combines separate light rays incident thereon from opposite sides thereof.

9. The optical circulator of claim 7, further including a fiber optic communication transmitter located adjacent to the first side surface of the reflection rhomb, and wherein the first surface of the reflection rhomb receives and transmits light from the fiber optic communication transmitter.

10. The optical circulator of claim 9, wherein a light-transmissive fiber located adjacent to the second side surface of the second birefringent crystal receives the light transmitted by the fiber optic communication transmitter and through the optical circulator.

11. The optical circulator of claim 7, further including a light-transmissive fiber having an end adjacent to the second side surface of the second birefringent crystal, and wherein the second birefringent crystal receives and transmits light from the light-transmissive fiber.

12. The optical circulator of claim 11, further including a fiber optic communication receiver located adjacent to the second end surface of the reflection rhomb, and wherein the fiber optic communication receiver receives the light transmitted from the light-transmissive fiber and through the optical circulator.

13. The optical circulator of claim 7, first and second birefringent crystals divide light incident upon one or more of the first and the second side surfaces thereof into separate paths depending upon the linear polarization characteristic of the light.

14. The optical circulator of claim 13, wherein the first and second birefringent crystals deflect light of a first linear polarization and transmit undeflected light of a second, orthogonally perpendicular linear polarization.

15. The optical circulator of claim 7, wherein the reciprocal polarization element imparts a rotation to the linear polarization of light incident thereon, the polarization rotation imparted to light incident on the first side surface being equal to the polarization rotation imparted to light incident on the second side surface thereof.

16. The optical circulator of claim 15, wherein the reciprocal polarization element imparts a 45 degree polarization rotation to light incident thereon.

17. The optical circulator of claim 7, wherein the non-reciprocal polarization element imparts a polarization rotation to light incident on the first side surface thereof and a different polarization rotation to light incident on the second side surface.

18. The optical circulator of claim 17, wherein the polarization rotation imparted to light incident on the first side surface of the non-reciprocal polarization element differs by 90 degrees from the polarization rotation imparted to light incident on the second side surface thereof.

19. The optical circulator of claim 7, wherein the reciprocal polarization element and the non-reciprocal polarization element cooperate to reverse the linear polarization of light passing therethrough from the first side surface of the reciprocal polarization element to the second side surface of the non-reciprocal polarization element, and to leave unchanged the linear polarization of light passing therethrough from the second side surface of the non-reciprocal polarization element to the first side surface of the reciprocal polarization element.

20. The optical circulator of claim 7, further including a single, light-transmissive fiber link for fiber optic communication, wherein the reflection rhomb, the first and second birefringent crystals, the reciprocal polarization element, and the non-reciprocal polarization element cooperate to transmit light incident upon a point on the first side surface of the reflection rhomb to a point on the second side surface of the second birefringent crystal, and further cooperate to transmit light incident upon the point on the second side surface of the second birefringent crystal to a point on the second end surface of the reflection rhomb, whereby the optical circulator permits bi-directional fiber optic communication on the single fiber link.

21. The optical circulator of claim 7, wherein the reciprocal polarization element comprises quartz.

22. The optical circulator of claim 7, wherein the non-reciprocal polarization element comprises yttrium-iron garnet crystal (YIG).

23. The optical circulator claim 7, wherein the first and second birefringent crystals comprise crystallite material selected from the group consisting of rutile and calcite.

24. The optical circulator of claim 7, further including a second reflection rhomb having first and second light transmissive side surfaces, having an inclined first end surface connecting the first and second side surfaces, having a second end surface opposite the first end surface, and having a polarizing thin film located between the first and second end surfaces, the first side surface being disposed against the second side surface of the second birefringent crystal.

25. The optical circulator of claim 24, wherein the polarizing thin film of the second reflection rhomb combines separate light rays incident thereon from opposite sides thereof.

26. The optical circulator of claim 25, wherein the polarizing thin films of the first and second reflection rhombs transmit light of a first linear polarization and reflect light of a second, orthogonally perpendicular linear polarization.

27. The optical circulator of claim 26, wherein the first and second reflection rhombs, the first and second birefringent crystals, the reciprocal polarization element, and the non-reciprocal polarization element cooperate to transmit light incident upon a point on the first side surface of the first reflection rhomb to a point on the second side surface of the second reflection rhomb, and further cooperate to transmit light incident upon the point on the second side surface of the second reflection rhomb to a point on the second end surface of the first reflection rhomb, and further cooperate to transmit light incident upon the point on the second end surface of the first reflection rhomb to a point on the second end surface of the second reflection rhomb, and further cooperate to transmit light incident upon the point on the second end surface of the second reflection rhomb to the point on the first side surface of the first reflection rhomb.

28. A method for providing bidirectional communication to and from a single light-transmissive fiber optic link, which comprises the steps of:
emitting an outgoing beam of randomly polarized light from a fiber optic communication transmitter;
dividing the outgoing beam in a first birefringent crystal into two outgoing beams, one for each of two orthogonal, linearly polarized states of light;
passing each divided outgoing beam through a reciprocal polarization element and a non-reciprocal polarization element to reverse the polarization of the light in each outgoing beam;
recombining the divided outgoing beams in a second birefringent crystal into a single outgoing beam of randomly polarized light;
transmitting the recombined outgoing beam into the fiber optic link;
emitting an incoming beam of randomly polarized light from the fiber optic link;
dividing the incoming beam in the second birefringent crystal into two incoming beams, one for each of two orthogonal, linearly polarized states of light;
passing each divided incoming beam through the non-reciprocal polarization element and the reciprocal polarization element in a direction opposite that of the divided outgoing beams, such that the polarization of light in each divided outgoing beam remains unchanged;
recombining the divided incoming beams in a reflecting device into a single incoming beam of randomly polarized light; and
transmitting the recombined incoming beam into a fiber optic communication receiver.

29. The method of claim 28, wherein the step of recombining the divided incoming beams further comprises:
reflecting one of the divided incoming beams from a surface of the reflecting device.

30. The method of claim 29, wherein the step of recombining the divided incoming beams further comprises:
transmitting the divided incoming beams to a polarizing thin film, each divided incoming beam being transmitted from an opposite side of the polarizing thin film.

31. The method of claim 28, wherein the reciprocal polarization element imparts an identical rotation to the polarization of both the divided outgoing beams and the divided incoming beams.

32. The method of claim 31, wherein the polarization rotation imparted by the reciprocal polarization element to the divided outgoing beams and to the divided incoming beams is 45 degrees in magnitude.

33. The method of claim 28, wherein the non-reciprocal polarization element imparts an equal in magnitude, but oppositely directed polarization rotation to the divided outgoing beams as compared to the divided incoming beams.

34. The method of claim 33, wherein the magnitude of the polarization rotation imparted by the non-reciprocal polarization element to the divided outgoing beams and to the divided incoming beams is 45 degrees.

* * * * *

UNITED STATES PATENT AND TRADEMARK OFFICE
CERTIFICATE OF CORRECTION

PATENT NO. : 5,319,483
DATED : June 7, 1994
INVENTOR(S) : Krasinski et al

It is certified that error appears in the above-indentified patent and that said Letters Patent is hereby corrected as shown below:

Column 2, line 19, delete "etal.", and insert -- et al. --

Column 3, line 44, delete "futile", and insert -- rutile --

Column 4, line 7, delete "futile", and insert -- rutile --

Column 4, line 51, delete "bee", and insert -- beams --

Column 4, line 65, delete "beanie", and insert -- beams --

Column 5, line 44, delete "bee", and insert -- beams --

Column 5, line 46, delete "bee", and insert -- beams --

Column 5, line 55, delete "$n \geq 0$", and insert -- $n \geq 0$ --

UNITED STATES PATENT AND TRADEMARK OFFICE
CERTIFICATE OF CORRECTION

PATENT NO. : 5,319,483
DATED : June 7, 1994
INVENTOR(S) : Krasinski et al

It is certified that error appears in the above-indentified patent and that said Letters Patent is hereby corrected as shown below:

Column 6, line 57, delete "FIG. 40", and insert -- FIG. 4 --

Column 7, line 29, delete "circulator the", and insert -- circulator 16, the --

Column 8, line 60, delete "forth", and insert -- form --

Column 10, line 17, delete "claim 7, first", and insert -- claim 7, wherein the first --

Signed and Sealed this

Thirteenth Day of September, 1994

BRUCE LEHMAN

Attest:

Attesting Officer

Commissioner of Patents and Trademarks